April 13, 1954     H. J. MODREY     2,674,774
SELF-LOCKING CLASP OR COUPLING
Filed July 14, 1950     2 Sheets-Sheet 1
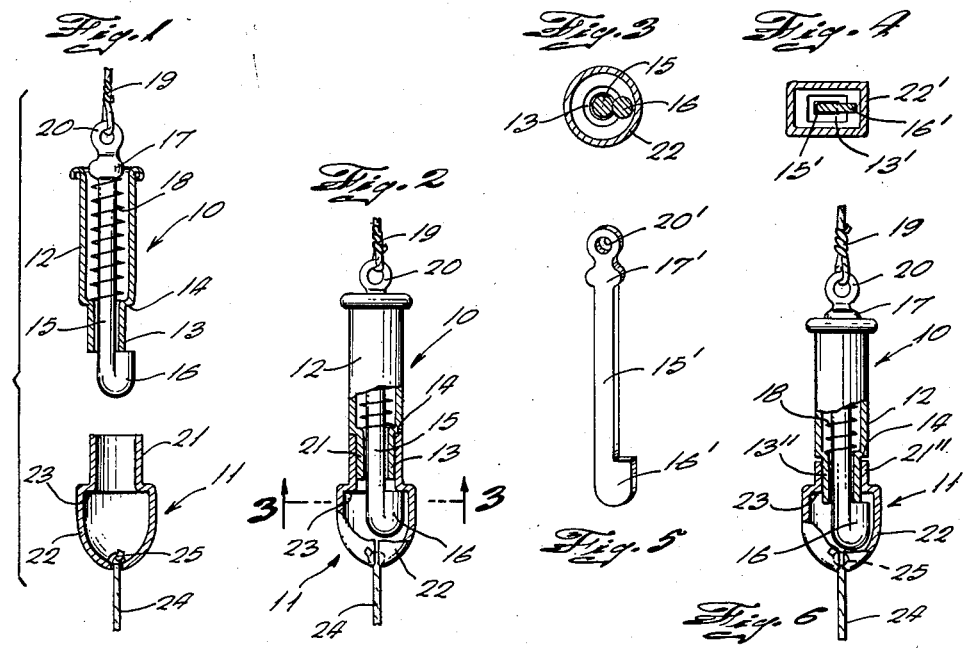
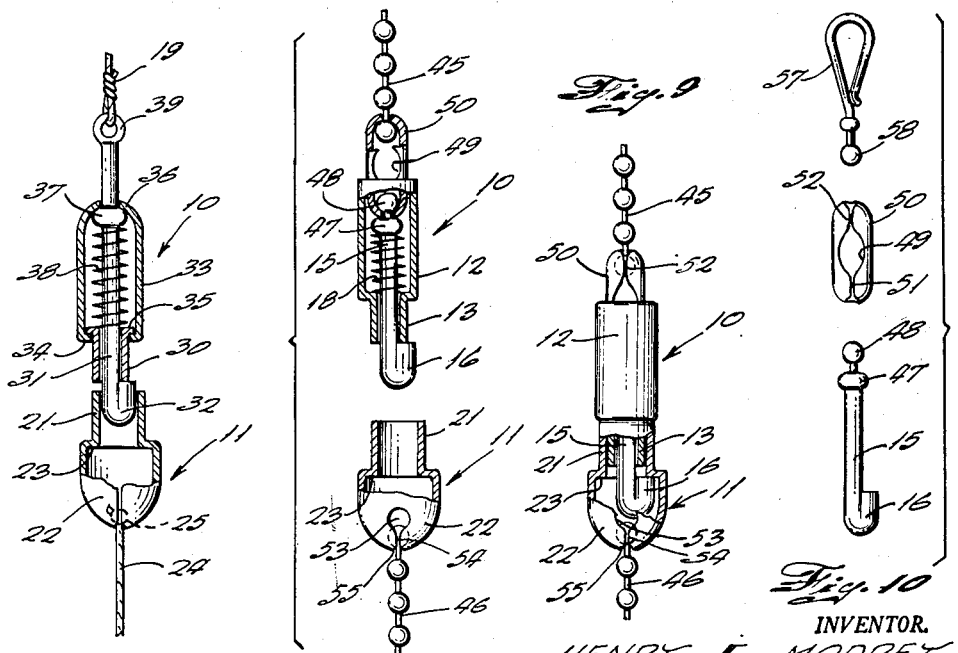
INVENTOR.
HENRY J. MODREY
BY
ATTORNEY.

April 13, 1954        H. J. MODREY        2,674,774
SELF-LOCKING CLASP OR COUPLING
Filed July 14, 1950        2 Sheets-Sheet 2
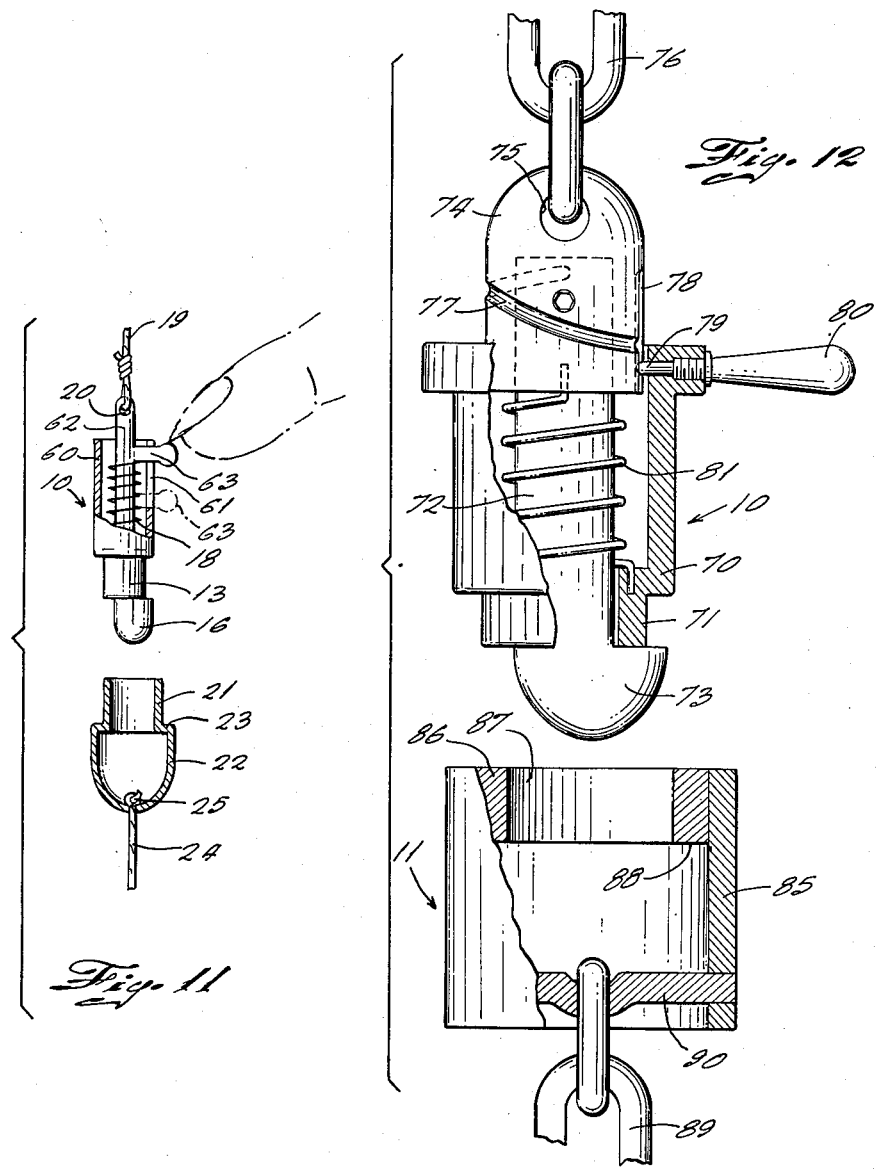
INVENTOR.
HENRY J. MODREY
BY
ATTORNEY.

Patented Apr. 13, 1954

2,674,774

UNITED STATES PATENT OFFICE 2,674,774

SELF-LOCKING CLASP OR COUPLING

Henry J. Modrey, Fleetwood, N. Y., assignor, by mesne assignments, to Interlock Corporation, New York, N. Y., a corporation of New Jersey Application July 14, 1950, Serial No. 173,734

20 Claims. (Cl. 24—211)

This invention relates to self-locking mechanical clasps or connectors having an engaging coupling member and a receiving coupling member for detachably coupling two elements. More particularly, the invention relates to clasps or connectors in which the engaging coupling member includes a clamping rod having an enlarged clamping head which, for latching the two coupling members together, is passed through a receiving opening of the receiving coupling member and held by the latter member in a position in which the clamping head overhangs the cross-section of the receiving opening.

One of the objects of the present invention is to provide a novel and generally improved self-locking mechanical clasp or connector of the type, herein referred to.

Another object of the invention is to provide a clasp or connector in which the engaging coupling member, when applied to the receiving coupling member, is deeply telescoped into the latter member, thereby preventing "wobbling" of the two coupling members relative one to the other.

Another object of the invention is to provide a clasp or connector, the two coupling members of which can freely swivel or spin about a common axis when applied one to the other. Such swiveling or spinning action is highly desirable for certain applications, for instance when the connector is employed to connect lures to the leader of fishing tackle.

Clasps or connectors according to the invention are particularly suitable for, though not limited, to small designs as employed especially in the jewelry field.

The clasp has been found for instance very useful to join detachably the end balls of bead chains or to connect flexible wires or cords terminating in an end ball, the end ball being held by the position of the locking mechanism in locked condition. Connections of the afore-mentioned type are frequently used for mounting automobile control cables and in the jewelry field for necklaces, etc.

In the jewelry field, the locking mechanism may be designed according to a further object of the invention so that its manipulation substantially duplicates the manipulation though not the function of a conventional spring ring.

In case a connector according to the invention is applied to a larger design intended to connect heavy elements, manual operation of the engaging coupling element is sometimes difficult or at least inconvenient. According to a further object of the invention, gearing or cam means are associated with the engaging coupling member of the connector which permit a convenient release operation under all load conditions without precluding release by direct manual operation, that is, without using the gearing or cam means.

Heavy duty connectors may be advantageously used in various fields, for instance as couplings for marine ropes, tractors, earth moving equipment, and other heavy machinery.

Other and further objects, features and advantages of the invention will be pointed out hereinafter and set forth in the appended claims.

In the accompanying drawing several now preferred embodiments of the invention are shown by way of illustration and not by way of limitation.

In the drawings:

Fig. 1 is a sectional side view of a mechanical clasp or connector according to the invention showing the coupling members separated one from the other.

Fig. 2 is a sectional view of the connector of Fig. 1 showing the coupling members in engaged position.

Fig. 3 is a section taken on line 3—3 of Fig. 2.

Fig. 4 is a sectional view similar to the view of Fig. 3 but showing a connector with a different cross-sectional configuration.

Fig. 5 is a perspective view of a clamping rod of the type used for a connector according to Fig. 4.

Fig. 6 is a sectional side view of a modification of a connector according to Figs. 1 and 2, the coupling members being shown applied to each other.

Fig. 7 is a sectional side view of another modification of a connector according to the invention, the coupling members being shown in an intermediate position relative to each other.

Fig. 8 is a sectional side view of a connector similar to Figs. 1 and 2 showing a modification of the means for attaching the elements to be connected to the connector, the coupling members being in a separated position.

Figs. 9 is a side view, partly in section, of the connector according to Fig. 8 with the coupling members applied one to the other.

Fig. 10 is an exploded view of the clamping rod of the connector according to Figs. 8 and 9 and of a modification of one of the elements to be connected by means of the connector.

Fig. 11 is a side view, partly in section, of another modification of a connector according to the invention, the coupling members being shown in separated position, and Fig. 12 is a side view, partly in section, of still another modification of a connector according to the invention, the coupling members being shown in separated position.

Referring now to Figs. 1 to 3 more in detail, the mechanical connector according to these figures comprises an engaging coupling member, generally designated by 10 and a receiving coupling member, generally designated by 11. The connectors as shown in Figs. 1 to 3 and also in Figs. 4 to 11 are particularly suitable for, but not limited to connectors of small design.

The engaging coupling member 10 comprises a sleeve 12 made of any suitable material, such as metal, and having a narrow portion 13 to form a shoulder 14. Sleeve 12, particularly the narrow portion 13 thereof, slidably guides a clamping rod 15 shown as being made of a round wire though not limited to such cross-section as will appear from the later description. The end of clamping rod 15 protruding from sleeve portion 13 is bent back upon itself to form a clamping head 16 one-sidedly overhanging the circumference of sleeve portion 13. The opposite end of the clamping rod is enlarged at 17 to form a shoulder against which one end of a coil spring 18 abuts. The other end of the spring abuts against the ledge or shoulder 14 formed by the narrow sleeve portion 13. The spring is preferably slightly loaded to bias clamping head 16 against the face edge of sleeve portion 13 as can best be seen in Fig. 1. One of the elements to be connected, shown in Figs. 1 and 2 as a wire 19, is secured to the clamping rod by any suitable means such as an eyelet 20.

The receiving coupling member 11 is shown as a hollow body having a sleeve portion 21 and a wider substantially cup-shaped portion 22. As will be noted, a shoulder or ledge 23 is formed between the two portions 21 and 22.

The configuration of sleeve portions 13 and 21 is so selected that portion 21 positively guides portion 13 when the latter is inserted in portion 21. Such positive guidance can be accomplished for instance by giving sleeve portion 13 such peripheral outline that it substantially fills sleeve portion 21 of the receiving coupling member if inserted in the same. Furthermore, the axial length of sleeve portion 13 is slightly shorter than the axial length of sleeve portion 21. The width or cross-section of cup portion 22 is so dimensioned that it provides space to accommodate the overhanging portion of clamping head 16 when the engaging coupling member is applied to the receiving coupling member. However, as will be more fully explained hereinafter, it would be functionally possible to omit portion 22 in which case the receiving coupling member would take the shape of a simple tube or eyelet of suitable dimensions.

The second element to be connected, shown as a wire 24, is secured to cup portion 22 by means of a knot 25 or other enlarged end element.

The operation of a connector according to Figs. 1 to 3 is as follows:

Let it be assumed that it is intended to apply engaging coupling member 10 to the receiving coupling member 11. Then, the operator grips the protruding end of the clamping rod and inserts the clamping head 16 in sleeve portion 21. As will be apparent, sleeve portion 13 is forced into an eccentric position relative to the axis of the receiving coupling member while the clamping head passes through sleeve portion 21, by reason of the overhanging portion of the clamping head. After the clamping head has reached a certain depth of insertion, the face edge of sleeve portion 13 abuts against the face edge of sleeve portion 21. As the axial pressure upon the clamping rod is continued, the clamping head is projected relative to sleeve portion 13 against the action of spring 18 so that the clamping head can penetrate deeper into and through sleeve portion 21 until the clamping head finally reaches cup portion 22 which is wide enough to accommodate the overhanging portion of the clamping head. Sleeve portion 13 now moves into a centric position and follows the clamping head into sleeve portion 21 by the action of spring 18 previously considerably compressed as a result of the projection of clamping head 16. The overhanging portion of the clamping head is abutting against shoulder 23, that is, all the components of the connector are now in the relative positions shown on Fig. 2.

As will be noted, the engagement between clamping head 16 and shoulder 23 prevents effectively a separation of the coupling members by pull on either of the wires 19 or 25, that is, the coupling members are latched together. It will further be noted that by reason of shoulder 14 limiting the depth of insertion of the engaging coupling member in the receiving coupling member and of the relative axial length of sleeve portions 13 and 21, as previously explained, the clamping head is held in a position in which it is projected relative to sleeve portion 13. This has the advantage that the overhanging portion of the clamping head is pressed by spring 18, now loaded more than in the position of Fig. 1, against shoulder 23 thereby impeding relative rotation of the coupling members which may cause an undesirable twisting of the connected elements. The frictional engagement between the coupling members together with the deep insertion of the engaging coupling member in the receiving coupling member also serve to steady the coupling members relative to each other.

When it is desired to separate the coupling members, the operator grips sleeve 12 and pulls it back. As a result, sleeve portion 13 is first withdrawn from sleeve portion 21. As soon as sleeve portion 13 clears the receiving edge of sleeve portion 21, the clamping head 16 can re-enter sleeve portion 21 and be withdrawn from the receiving coupling member.

It will now be apparent that, as previously mentioned, cup portion 22 primarily serves to attach wire 24 but that the locking mechanism will function in the same manner without the cup portion 22, the lower end of sleeve portion 21 providing the necessary abutment.

The connector according to Fig. 4 is designed similarly to the connector according to Figs. 1 to 3 with the difference that the general round cross-section of Figs. 1 to 3 is replaced by a rectangular cross-section. The same numerals are therefore employed though primed. It will further be apparent that various other cross-sections of the components of the connector may also be employed.

Fig. 5 shows a perspective view of a flat clamping rod as used in the connector according to Fig. 4.

The non-round cross-section of Figs. 4 and 5 has the advantage that it positively prevents a rotational relative movement between the coupling members.

As is described in connection with Figs. 1 to 3, relative rotation of the coupling members of this connector is frictionally impeded by retaining the clamping head in a projected position so that the same is pressed against shoulder 23. However, for certain applications such braking action between the two coupling members is undesirable. For instance, when a connector according to the invention is used to attach a lure to the leader of fishing tackle. For such application, a spinning or swiveling action is required. Fig. 6 shows a connector which provides a spinning action. The connector according to this figure is similar in all respects to the connector according to Fig. 1 with the exception that the relative axial length of sleeve portions 13'' and 21'' are so selected that sleeve portion 13'' protrudes beyond sleeve portion 21'' when the coupling members are applied one to the other. As a result, clamping head 16 is seated against the face edge of sleeve portion 13'' and held in a position spaced from shoulder 23. Consequently, the coupling members can freely spin or swivel relative to each other. Of course, the coupling members can also move axially relative to each other when latched together but such relative axial movement can be easily held within acceptable limits and does not interfere with the locking effect.

The operations necessary to apply the coupling members according to Fig. 6 to each other and to separate the coupling members one from the other are substantially identical and will be obvious from the previous description.

While in the previously described embodiments connection of the coupling members requires manipulation of the clamping rod and release manipulation of sleeve 12, Fig. 7 shows an exemplification of the invention permitting connection and release of the coupling members by manipulation of the same component of the engaging coupling member.

According to Fig. 7, the engaging coupling member comprises a guide sleeve 30 within which is slidably guided a clamping rod 31. The clamping rod which may have any suitable cross-section is shown as being formed from a round wire bent back upon itself on one end to form a clamping head 32 one-sidedly overhanging guide sleeve 30. The guide sleeve is slidably disposed in a control member shown as a sleeve 33 into which clamping rod 31 is also extended. Control sleeve 33 has on one end an inwardly extending flange 34 engageable with an outwardly extending flange 35 of guide sleeve 30 to form a one-way coupling. As will be noted, flanges 34 and 35 permit movement of guide sleeve 30 into control sleeve 33 but limit an outward movement of the guide sleeve. The other end of control sleeve 33 is constricted to form an abutment 36 coacting with an enlarged portion 37 of the clamping rod which is slidably extended through the control sleeve. As will be apparent, abutment 36 and enlargement 37 form a second one-way coupling permitting downward movement of the clamping rod (as seen in Fig. 7) but limiting upward movement of the rod. A preferably loaded coil spring 38 abutting with one end against enlargement 37 and with the other against guide sleeve 30 biases clamping head 32 toward and against the face edge of guide sleeve 30. Clamping rod 31 ends in an eyelet 39 to attach element 19.

The receiving coupling member corresponds to the receiving coupling member of Fig. 1, as is indicated by employing the same numerals.

The relative axial length of the guide member portion protruding from control sleeve 33 and of sleeve portion 21 is again so selected that the clamping head is projected from guide sleeve 30, as is described in connection with Figs. 1 to 3, when the coupling members are joined and clamping head 32 abuts against shoulder 23, the exterior of flange 34 limiting the depth of insertion of the engaging coupling member in the receiving coupling member.

The operation of the connector according to Fig. 7 is as follows:

Let is be assumed that it is desired to apply the engaging coupling member to the receiving coupling member. Then, the operator grips control sleeve 33 and inserts the clamping head into sleeve portion 21, as is indicated in Fig. 7, until the face edge of guide sleeve 30 abuts against the face edge of sleeve portion 21, guide sleeve 30 being forced into an eccentric position by the overhanging portion of the clamping head. If now the axial pressure upon sleeve 33 is continued, guide sleeve 30 is telescoped into the control sleeve while the clamping rod is held stationary relative to the control sleeve by enlargement 37, the two one-way couplings being effective in opposite directions. Consequently, the clamping head is projected relative to guide sleeve 30 until finally the overhanging portion of the clamping head slips over shoulder 23. Guide member 30 now moves into a centric position and is snapped by the action of spring 38, which has been considerably compressed during the aforementioned penetration of the clamping head, into sleeve portion 21. All the components are now in relative positions similar to the positions shown in Fig. 2. As will be noted, guide sleeve 30 is positively guided by sleeve portion 21 so that the engaging coupling member is well steadied in the receiving coupling member.

When it is desired to separate the coupling members, the operator again grips control sleeve 33 and pulls the same upwardly (as seen in Fig. 7). As a result, flanges 34 and 35 engage each other when and while the control sleeve is pulled upwardly relative to the clamping rod the head of which is still held by shoulder 23. As soon as guide sleeve 30 clears sleeve portion 21, the clamping head can re-enter sleeve portion 21 so that the clamping head can be withdrawn from sleeve portion 21. Spring 38 now returns guide sleeve 30 into the position shown in Fig. 7 and the clamping rod also resumes the position shown in this figure.

It will again be evident that cup portion 22 is not essential for the function of the locking mechanism.

It will further be apparent that the connector according to Fig. 7 can be designed to swivel or spin by providing a relative axial length of sleeve portion 21 and of the protruding portion of guide sleeve 30 as is described in connection with Fig. 6.

The exemplification of the invention according to Figs. 8 and 9 is similar to the one according to Figs. 1 to 3 as to the design and function of the locking mechanism. Identical numerals are employed to designate corresponding parts.

The connector of Figs. 8 and 9 is specifically designed to connect detachably the two end balls of the ends 45 and 46 of a bead chain or two wires each terminating in an end ball and to lock these end balls against removal once the connector is locked. For this purpose, clamping rod 15 is secured to a splicing link 50 which may or may not be of conventional design, a conventional link being shown. The connection between the rod and the link may be permanent, for instance by soldering or crimping, or removable. To provide a removable connection, the clamping rod ends in two spaced knobs 47 and 48. Knob 48 is slipped by means of a receiving opening 49 of splicing link 50 and a slot 51 in the link into the position shown in Fig. 8 in which the clamping rod extends from a bottom hole of the splicing link. Similarly, the end ball of chain 45 is inserted in opening 49 and slipped through an upper slot 52 into the position shown in Fig. 8. Of course, the splicing link may also be folded over knob 48. As can best be seen in Fig. 8, link 50 is slidably guided in sleeve 12 and opening 49 is so positioned that it is above the rim of sleeve 12 when the coupling members are separated and clamping head 16 is seated against the face edge of sleeve portion 13, thereby permitting insertion and removal of the end ball of chain 45. Fig. 9 shows that when the two coupling members are latched together the clamping head is projected relative to sleeve portion 13 causing splicing link 50 to be telescoped into sleeve 12 sufficiently deeply to conceal opening 49 partly or completely by sleeve 12, thereby locking the aforesaid end ball of chain 45 within the splicing link.

The end 46 of the bead chain is similarly attached to the receiving coupling member by means of a hole 53 and a slot 54 leading into a bottom hole 55 from which chain end 46 protrudes. As can best be seen in Fig. 9, clamping head 16 locks the end ball of chain end 46 in cup portion 22.

It will now be apparent that a connector or clasp according to Figs. 8 and 9 provides a triple lock, one lock being formed by the partial concealment of the end ball of chain end 45 in sleeve 12, the second by the locking mechanism proper, and the third by the clamping head locking the end ball of chain end 46 in cup portion 22.

Fig. 10 shows that a connector or clasp design according to Figs. 8 and 9 and a splicing link 50 can also be employed to attach a hook 57 having an end ball 58 to the engaging coupling member. The splicing link can again be permanently or removably attached to the clamping rod by any suitable means. It will be obvious that hook 57 could also be conveniently attached to the receiving coupling member by inserting ball 58 into hole 53. In any event, ball 58 will be locked to the clasp either by sleeve 12 or clamping head 16.

Fig. 11 shows a connector or clasp with a locking mechanism similar in principle to the locking mechanism according to Figs. 1 to 3. The sleeve of the engaging coupling member is shown as a rimless sleeve 60 having an axial slot 61. The clamping rod 62, which may have a round or a flat cross-section is provided with a knob 63 laterally protruding from slot 61. As will be apparent, clamping rod 62 and with it knob 63 will be biased by spring 18 into the position shown in full lines when the coupling members are separated.

For purpose of locking the coupling members together, the operator projects the clamping head by pressing a finger nail against knob 63, whereupon the engaging coupling member can be fitted into the receiving coupling member and locked therein as previously described. Similarly, for separating the coupling members, the operator presses knob 63 into the dotted position thereby projecting the clamping head sufficiently to permit withdrawal of the clamping head. Of course, the coupling members can also be separated by gripping sleeve 60 and pulling the same away from the receiving coupling member.

As will be evident, the locking and release operations by manipulating knob 63 by means of a finger nail duplicate in effect the manipulation of a conventional spring ring though on a straight line. This has the advantage that an operator will be able to use the connector without specific instructions. The connector according to Fig. 11 is particularly useful in a field where spring rings are frequently used, for instance as clasps in the jewelry field.

The connector according to Fig. 12 is particularly intended and useful for heavy loads, for instance for connecting heavy chains, tractor horses and earth moving equipment. In such fields of application, particularly under load, the operation of the release sleeve is sometimes difficult or inconvenient.

The engaging coupling member of the connector comprises a sleeve 70 having a set-off or throat portion 71. Sleeve 70, particularly the throat portion thereof, slidably guides a clamping rod 72 which terminates on one end in a clamping head 73 onesidedly overhanging sleeve portion 71. The other end of rod 72 terminates in a rod portion 74 protruding from sleeve 70 and connected by means of an opening 75 to a chain 76. Rod portion 74 and sleeve 70 are releasably coupled by gearing or cam means. These means are shown as a helical cam surface in form of a groove 77 in the outer surface of rod portion 74 and an axial groove 78 in rod portion 74 traversing the helical groove. A stud 79 threaded into sleeve 70 and continued as a handle 80 is engageable with either of said grooves. The operational spring means of the engaging coupling member are shown as a coil spring 81 secured at one end to rod portion 74 and at the other end to sleeve 70.

The receiving coupling member of the connector is shown as a sleeve 85 within which is fixed a ring 86 to form a receiving opening 87 and an abutment shoulder 88. Of course, shoulder 88 may also be formed in the sleeve proper. A chain 89 which may be visualized as a second chain or as the end link of the same chain may be secured to the receiving coupling member by any suitable means such as a plate 90 secured to sleeve 85.

The operation of the locking mechanism will be obvious from the previous description. It suffices to say that when the two coupling members are latched together the overhanging portion of clamping head 73 abuts against shoulder 88 and the clamping head is held in a slightly projected position relative to sleeve portion 71 as was described in connection with Figs. 1 to 3. As a result of this projection of the clamping head, rod portion 74 is also moved into a position in which stud 79 faces the helical groove 77.

Reverting now to the function of grooves 77, 78 and stud 79 in connection with the release operation which essentially consists of a withdrawal of sleeve 70 relative to clamping head 73, the arrangement and relative position of the grooves permit selectively two different release operations.

1. The operator can try to pull sleeve 70 straight upwardly (as seen in the drawing) by gripping handle 80 or the sleeve directly. The axial length of grooves 78 must of course be sufficient to permit the required relative displacement of the clamping rod and the sleeve.

2. If the operator should find direct lifting of sleeve 70 too difficult, he rotates sleeve 70 relative to the clamping rod by means of handle 80. As a result, stud 79 sliding in groove 77 forces sleeve 70 upwardly relative to the clamping rod, it being assumed that pull applied to the coupling members is sufficiently heavy to maintain the clamping rod substantially stationary. It will of course be understood that the circumferential length of the helical groove must be sufficiently long to permit the required lifting of sleeve 70.

It will be obvious that by selecting a suitable pitch of the helical groove a great lifting force can be conveniently applied to the sleeve and the effective portion of the groove is the lower wall thereof so that the cam surface can also be supplied by setting off the top part of rod portion 74 rather than by providing a groove. It will also be obvious that the illustrated embodiment can be reversed by providing the grooves in the inner wall of sleeve 70 and the stud on rod portion 74.

As will be appreciated, spring 81 in addition to being compressed during the release operation experiences also a torsional loading when sleeve 70 is rotated. This has the advantage that the spring tends to return the clamping rod and sleeve 70 into a relative position in which stud 79 engages axial groove 78 when the coupling members are disconnected. In practice, the spring is preferably mounted with slight compression and torsion so that stud 79 is always biased toward the lower wall of groove 78 and any tendency of the stud to catch at the entrance of the helical groove is eliminated.

The design according to Fig. 12 has the additional advantage that the cross-section of the rod proper is not impaired by any bores or undercuts which is very important for high stress loads.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. In a self-locking mechanical connector for detachably connecting two elements, in combination an engaging coupling member comprising an axially elongated guide member having an opening therein, a clamping rod guided axially slidably within said guide member, said rod having on one end an axially elongated clamping head protruding from the opening of said guide member and one-sidedly overhanging the peripheral cross-section thereof, the said rod being adapted to be connected to one of said elements, and yieldable means coacting with the rod so as to bias the head thereof toward the guide member and to permit projection of the clamping head relative to the guide member against the action of the yieldable means; and a receiving coupling member adapted to be connected with the other of said elements and comprising a sleeve member, the peripheral outline of said elongated clamping head and of said guide member respectively each substantially conforming to the inner configuration of said sleeve member so as to provide for an axially guided passage of the clamping head through said sleeve member and an axial guidance of the guide member within the sleeve member upon application of the engaging coupling member to one end of the sleeve member, the opposite end of the sleeve member forming an abutment in the path of the overhanging portion of the clamping head upon complete passage thereof through said sleeve member and subsequent insertion of the guide member in the said sleeve member, thereby latching the engaging coupling member to the receiving coupling member when pressure applied to the yieldable means for projection of the clamping head is released.

2. In a self-locking mechanical connector for detachably connecting two elements, in combination an engaging coupling member comprising an axially elongated guide member having an opening therein, a clamping rod guided axially slidably within said guide member, said rod having on one end an axially elongated clamping head protruding from the opening of said guide member and one-sidedly overhanging the peripheral cross-section thereof, the said rod being adapted to be connected to one of said elements, and yieldable means coacting with the rod so as to bias the head thereof toward the guide member and to permit projection of the clamping head relative to the guide member against the action of the yieldable means; and a receiving coupling member adapted to be connected with the other of said elements and comprising a sleeve member, the peripheral outline of said elongated clamping head and of said guide member respectively each substantially conforming to the inner configuration of said sleeve member so as to provide for an axially guided passage of the clamping head through said sleeve member and an axial guidance of the guide member within the sleeve member upon application of the engaging coupling member to one end of the sleeve member, the opposite end of the sleeve member forming an abutment for the overhanging portion of the clamping head upon complete passage thereof through said sleeve member and subsequent insertion of the guide member in the said sleeve member, thereby latching the engaging coupling member to the receiving coupling member in axial alignment therewith when pressure applied to the yieldable means for projection of the clamping head is released and the latter is abutting against said abutment; and limit means included in said coupling members and causing the clamping rod to be biased into a position in which the clamping head thereof is pressed against said abutment when the two coupling members are latched one to the other.

3. In a self-locking mechanical connector for detachably connecting two elements in combination an engaging coupling member comprising an axially elongated guide member having an opening therein, a clamping rod guided axially slidably within said guide member and adapted to be connected to one of said members, said rod having on one end an axially elongated clamping head protruding from the opening of said guide member and one-sidedly overhanging the peripheral cross-section thereof, and yieldable means coacting with the rod so as to bias the head thereof toward the guide member and to permit projection of the clamping head relative to the guide member against the action of the yieldable means; and a receiving coupling member adapted to be connected to the other element and comprising a sleeve member, the peripheral outline of said elongated clamping head and of said guide member respectively each substantially conforming to the inner configuration of said sleeve member so as to provide for an axially guided passage of the clamping head through said sleeve member and an axial guidance of the guide member within the sleeve member upon application of the engaging coupling member to one end of the sleeve member, the opposite end of the sleeve member forming an abutment for the overhanging portion of the clamping head upon complete passage thereof through said sleeve member and subsequent insertion of the guide member in the said sleeve member, thereby latching the engaging coupling member to the receiving coupling member when pressure applied to the yieldable means for projection of the clamping head is released and the latter is abutting against said abutment, the said guide member having limit means thereon coacting with the receiving coupling member for limiting the depth of insertion of said guide member in the sleeve member to a position in which the clamping head is retained by the abutment in a projected position relative to the guide member in which position said yieldable means are loaded for pressing said clamping head against the end of the sleeve member forming said abutment.

4. In a self-locking mechanical connector for detachably connecting two elements, in combination an engaging coupling member comprising a guide sleeve, a clamping rod disposed slidably within said sleeve and having an axially elongated clamping head on one end protruding from the sleeve and one-sidedly overhanging the peripheral outline of the sleeve, said rod being adapted to be connected with one of said elements, yieldable means coacting with the rod so as to bias the clamping head thereof toward said sleeve; and a receiving coupling member comprising a sleeve including a narrow portion and a wide portion, said narrow sleeve portion forming the receiving end of the sleeve of the receiving coupling member and having an inner configuration corresponding to the outer configuration of the clamping head and the guide sleeve respectively so as to provide for an axially guided passage of the clamping head through said narrow sleeve portion and for axial guidance of the guide sleeve when inserted in said narrow sleeve portion, said wide sleeve portion being shaped to accommodate the overhanging portion of the clamping head, the wall portion of the receiving sleeve member defining the boundary between the narrow and the wide sleeve portion of the said sleeve forming an abutment in the path of the overhanging portion of the clamping head upon complete passage thereof through said narrow sleeve portion and subsequent insertion of the guide sleeve in the said narrow sleeve portion, said receiving coupling member being adapted to be connected with the other element, whereby, upon projection of the clamping head relative to the guide sleeve by application of pressure to the yieldable means and passage of the clamping head thus projected through the narrow sleeve portion and subsequent insertion of the guide sleeve in the narrow sleeve portion, the engaging coupling member is latched to the receiving coupling member upon release of the yieldable means.

5. In a self-locking mechanical connector for detachably connecting two elements, in combination an engaging coupling member comprising a guide sleeve, a clamping rod disposed slidably within said sleeve and having an axially elongated clamping head on one end protruding from the sleeve and one-sidedly overhanging the peripheral outline of the sleeve, said rod being adapted to be connected with one of said elements, yieldable means coacting with the rod so as to bias the clamping head thereof toward said sleeve; and a receiving coupling member comprising a sleeve including a narrow portion and a wide portion, said narrow sleeve portion forming the receiving end of the sleeve and having an inner configuration corresponding to the outer configuration of the clamping head and the guide sleeve respectively so as to provide for an axially guided passage of the clamping head through said narrow sleeve portion and for axial guidance of the guide sleeve when inserted in said narrow sleeve portion, said wide sleeve portion being shaped to accommodate the overhanging portion of the clamping head, the wall portion of the receiving sleeve forming the boundary between said narrow and said wide sleeve portion providing an abutment for the overhanging portion of the clamping head upon complete passage thereof through said narrow sleeve portion and subsequent insertion of the guide sleeve in the said narrow sleeve portion, said receiving coupling member being adapted to be connected with the other element, whereby, upon projection of the clamping head relative to the guide sleeve by application of pressure to the yieldable means and passage of the clamping head thus projected through the narrow sleeve portion and subsequent insertion of the guide sleeve in the narrow sleeve portion, the engaging coupling member is latched to the receiving coupling member upon release of the yieldable means, said guide sleeve having limit means thereon coacting with the receiving coupling member for limiting the depth of insertion of said guide sleeve in said narrow sleeve portion of the receiving sleeve to a position in which the clamping head is retained by the abutment in a projected position relative to said guide sleeve and said yieldable means are loaded for pressing said clamping head against said abutment formed in the receiving sleeve.

6. A connector as defined in claim 5, wherein said limit means comprise a shoulder on the outside wall of the guide sleeve engageable with a wall portion of the receiving sleeve defining the receiving end of said narrow sleeve portion thereof thereby limiting the depth of insertion of the guide sleeve, and wherein the axial length of the guide sleeve between said shoulder and the sleeve end from which the clamping head protrudes is shorter than the axial depth of said narrow sleeve portion, thereby retaining an inserted clamping head in said projected relative position in which the yieldable means are loaded and press the clamping head against said abutment.

7. A connector as defined in claim 6, wherein the end portion of the guide sleeve from which said clamping head protrudes is reduced in diameter to form said shoulder, the axial length of said reduced sleeve portion determining the depth of insertion of the guide sleeve in the receiving sleeve therefor.

8. A connector as defined in claim 1, in combination with limit means included in one of said coupling members and limiting the depth of insertion of the guide member in said receiving sleeve to a position in which the guide member in a position of maximal insertion protrudes slightly beyond said abutment so as to provide for a relative axial displacement of the latched coupling members, said displacement being limited by the axial length of the protruding portion of the guide member, thereby permitting a relative spinning action of the coupling members about their axes.

9. A connector as defined in claim 1, wherein the element to be connected to the engaging coupling member terminates in an enlarged portion, in combination with a splicing link attached to the clamping rod and adapted to receive and hold the said enlarged portion, thereby operatively connecting the respective element with the clamping rod.

10. A connector as defined in claim 3, wherein the element to be connected to the engaging coupling member terminates in an enlarged portion, in combination with a splicing link attached to the clamping rod and adapted to receive and hold the said enlarged portion, thereby operatively connecting the respective element with the clamping rod.

11. A connector as defined in claim 3, wherein the element to be connected to the engaging coupling member terminates in an enlarged portion, in combination with a splicing link attached to the clamping rod and adapted to receive and hold the said enlarged portion, thereby operatively connecting the respective element with the clamping rod, said splicing link including a receiving opening for the said enlarged portion and being slidably extended into the opening of the guide member so that the receiving opening of the link is positioned outside the guide member when the coupling members are separated and at least partly concealed by the guide member when the coupling members are latched together and the clamping head is projected relative to the guide member, thereby locking the clamping rod and the respective element within the splicing link.

12. A connector as defined in claim 1, wherein the said element to be connected with the receiving coupling member terminates in an enlarged portion, and wherein a wall portion of said receiving coupling member includes an opening having a wide section for inserting said terminal portion in the receiving coupling member and a narrow portion for receiving an inserted terminal portion in the receiving coupling member, the said clamping head, when in locking position, being positioned to block removal of said terminal portion through said wide section.

13. In a self-locking mechanical connector for detachably connecting two elements, in combination an engaging coupling member and a receiving coupling member, said engaging coupling member comprising a guide member having an opening therein, a clamping rod slidably guided in said guide member and adapted to be connected with one of said elements, said rod having on one end a clamping head protruding from said opening and one-sidedly overhanging the peripheral outline of the guide member, yieldable means coacting with the clamping rod so as to bias the clamping head toward said guide member and to permit projection of the clamping head relative to the guide member against the action of the yieldable means, and double-action control means for effecting connection and disconnection of the coupling members, said control means comprising a control member in which said guide member is slidably disposed with the clamping rod extending into the control member, first one-way coupling means operative for coupling the control member with the guide member, and second one-way coupling means operative for coupling the control member with the clamping rod, said coupling means being arranged to be effective for coupling action in opposite directions so as to provide for displacement of the guide member relative to the control member and the clamping head in response to a control member movement in one direction and for displacement of the guide member conjointly with the control member relative to the clamping head in response to a control member movement in opposite direction; and said receiving coupling member being adapted to be connected to the other of said two elements and having a receiving opening therein providing for passage of the clamping head therethrough and positively guiding the guide member when inserted in said opening from one end thereof, the wall portion of the receiving coupling member defining the opposite end of the receiving opening forming an abutment in the path of the overhanging portion of the clamping head upon complete passage thereof through the said opening and subsequent insertion of the guide member in said receiving opening, thereby latching the coupling members together when pressure applied to the yieldable means for projection of the clamping head is released.

14. In a self-locking mechanical connector in combination an engaging coupling member and a receiving coupling member for detachably connecting two elements, said engaging coupling member comprising a guide member having an opening therein, a clamping rod slidably guided in said guide member and adapted to be connected with one of said elements, said rod having on one end a clamping head protruding from said opening and one-sidedly overhanging the peripheral outline of the guide member, yieldable means coacting with the clamping rod so as to bias the clamping head toward said guide member and to permit projection of the clamping head relative to the guide member against the action of the yieldable means, and double-action control means for effecting connection and disconnection of the coupling members, said control means comprising a control member in which said guide member is slidably disposed with the clamping rod extending into the control member, first one-way coupling means operative for coupling the control member with the guide member, and second one-way coupling means operative for coupling the control member with the clamping rod, said coupling means being arranged to be effective for coupling action in opposite directions so as to provide for displacement of the guide member relative to the control member and the clamping head in response to a control member movement in one direction and for displacement of the guide member conjointly with the control member relative to the clamping head in response to a control member movement in opposite direction; and said receiving coupling member being adapted to be connected to the other of said two elements and having therein an outer opening providing for passage of the clamping head and positively guiding said guide member when inserted in the outer opening from one end thereof, the opposite end of the said outer opening issuing into an inner opening aligned with the outer one and shaped to accommodate the overhanging portion of the clamping head, the wall portion of the receiving member defining said opposite end of the outer opening of the receiving coupling member forming an abutment for the overhanging portion of the clamping head upon complete passage therethrough through said outer opening and subsequent insertion of the guide member in the said outer opening, whereby, upon projection of the clamping head relative to the guide member by application of pressure to the yieldable means and passage of the clamping head thus projected through the outer opening and subsequent insertion of the guide member in the outer opening, the coupling members are latched together upon release of the yieldable means, said engaging coupling member including limit means coacting with the receiving coupling member for limiting the depth of insertion of said guide member in the said receiving opening to a position in which the clamping head is retained by the abutment in a projected position relative to the guide member and in which said yieldable means are loaded for pressing said clamping head against said abutment of the receiving coupling member.

15. An engaging coupling member for use in a self-locking mechanical connector having a receiving coupling member comprising a guide member having an opening therein, a clamping rod slidably guided in the guide member and rotatable relative thereto, said rod having a clamping head on one end protruding from said opening of the guide member and one-sidedly overhanging the peripheral outline of the guide member, yieldable means within the guide member and coacting with the rod so as to bias the clamping head toward the guide member, and cam means between the clamping rod and the guide member operatively coupling said rod with said guide member for axial displacement of the guide member and the clamping rod relative one to the other in response to a relative rotation of the clamping rod and the guide member.

16. An engaging coupling member for use in a self-locking mechanical connector having a receiving coupling member, comprising a guide member having an opening therein, a clamping rod member slidably guided in the guide member and rotatable relative thereto, said rod member having a clamping head on one end protruding from said opening of the guide member and one-sidedly overhanging the peripheral outline of the guide member, and yieldable means within the guide member and coacting with the rod member so as to bias the clamping head toward the guide member, one of the said two members having a cam surface and the other a projection engageable one with the other for withdrawing the guide member relative to the clamping head in response to a relative rotation of the clamping rod member and the guide member.

17. An engaging coupling member for use in a self-locking mechanical connector having a receiving coupling member, comprising a guide member having an opening therein, a clamping rod slidably guided within said member and rotatable relative thereto, said clamping rod having a clamping head on one end protruding from said opening of the guide member and one-sidedly overhanging the peripheral outline of the said member, and yieldable means within the guide member and coacting with the clamping rod so as to bias the clamping head toward the guide member, the peripheral wall of the clamping rod including a helical cam surface and an axially extended groove issuing in said cam surface, and an actuating member on said guide member including a projection inwardly extending from the member wall defining the opening thereof, said projection being selectively engageable with either said cam surface or said groove for withdrawing the guide member relative to the clamping head either by rotating the guide member relative to the clamping rod with said projection engaging the cam surface or by axially displacing the guide member with said projection engaging the axial groove.

18. An engaging coupling member as defined in claim 17, wherein said yieldable means comprise an axially loaded coil spring disposed within said guide member, one end of said spring being secured to the clamping rod and the other to the guide member for torsionally loading said spring by a rotation of the guide member relative to the clamping rod so as to bias the rod and the guide member into a relative position in which said projection engages said axial groove.

19. An engaging coupling member for use in a mechanical self-locking connector having a receiving coupling member comprising a guide member having an opening therein, a clamping rod slidably guided in said guide member, said rod having on one end a clamping head protruding from said opening and one-sidedly overhanging the peripheral outline of the guide member, yieldable means coacting with the clamping rod so as to bias the clamping head toward said guide member and to permit projection of the clamping head relative to the guide member against the action of the yieldable means, and double-action control means for effecting connection and disconnection of the coupling members, said control means comprising a control member in which said guide member is slidably disposed with the clamping rod extending into the control member, first one-way coupling means including coacting components on the control member and the guide member respectively operative for coupling the control member with the guide member, and second one-way coupling means including coacting components on the control member and the clamping rod respectively operative for coupling the control member with the clamping rod, said coupling means being arranged to be effective for coupling action in opposite directions so as to provide for displacement of the guide member relative to the control member and the clamping head in response to a control member movement in one direction and for displacement of the guide member conjointly with the control member relative to the clamping head in response to a control member movement in opposite direction.

20. An engaging coupling member for use in a self-locking mechanical connector for detachably connecting two elements comprising an open ended sleeve shaped guide member, the side wall of said sleeve member being formed with an axial slot, a clamping rod slidably guided within said sleeve member and protruding therefrom, the protruding end of the clamping rod having thereon an axially elongated clamping head one-sidedly overhanging the peripheral outline of said sleeve member, yieldable means coacting with the rod so as to bias the clamping head thereon toward the said sleeve member, and an actuation knob extending from the clamping rod and through said slot in the sleeve member for moving the clamping rod relative to the sleeve member and against the action of said yieldable means.

References Cited in the file of this patent

UNITED STATES PATENTS

| Number | Name | Date |
| --- | --- | --- |
| 2,464,543 | Modrey | Mar. 15, 1949 |
| 2,465,328 | Modrey | Mar. 22, 1949 |